US008509502B2

(12) United States Patent
Porat et al.

(10) Patent No.: US 8,509,502 B2
(45) Date of Patent: Aug. 13, 2013

(54) SPINE LABELING

(75) Inventors: Hadar Porat, Tel-Aviv (IL); Shmuel Akerman, Binyamina (IL); Hadas Padan, Tel-Aviv (IL)

(73) Assignee: Algotec Systems Ltd., RaAnana (IL)

( * ) Notice: Subject to any disclaimer, the term of this patent is extended or adjusted under 35 U.S.C. 154(b) by 1090 days.

(21) Appl. No.: 11/984,876

(22) Filed: Nov. 23, 2007

(65) Prior Publication Data

US 2008/0132784 A1 Jun. 5, 2008

(30) Foreign Application Priority Data

Nov. 26, 2006 (IL) .......................................... 179581

(51) Int. Cl.
*G06K 9/00* (2006.01)
(52) U.S. Cl.
USPC ............................ 382/128; 382/173; 600/426
(58) Field of Classification Search
USPC ........................................................ 382/128
See application file for complete search history.

(56) References Cited

U.S. PATENT DOCUMENTS

| | | | | |
|---|---|---|---|---|
| 7,526,114 | B2 * | 4/2009 | Xia et al. ....................... | 382/128 |
| 7,706,603 | B2 * | 4/2010 | Najafi et al. .................. | 382/154 |
| 8,175,412 | B2 * | 5/2012 | Basri et al. .................... | 382/278 |
| 2006/0077255 | A1 * | 4/2006 | Cheng ........................... | 348/143 |
| 2006/0120583 | A1 * | 6/2006 | Dewaele ........................ | 382/128 |

OTHER PUBLICATIONS

Cormen et al. "Single-Source Shortest Paths", Introduction to Algorithms, 2nd Ed.(Chap.24): 580-619, May 2001.
Fischler et al. "Random Sample Consensus: A Paradigm for Model Fitting With Applications to Image Analysis and Automated Cartography", Graphic and Image Processing, Communications of the ACM, 24(6): 381-395, Jun. 1981.
Forsyth et al. "Segmentation and Fitting Using Probalistic Methods: Ransac", Computer Vision, Chap.17.2.3: 480-483, 2003.
Galun et al. "Texture Segmentation by Multiscale Aggregation of Filter Responses and Shape Elements", Proceedings of the Ninth IEEE International Conference on Computer Vision (ICCV 2003), Nice, France, Oct. 13-16, 2003, 1: 716-723, 2003.
Hartley et al. "Estimation—2D Projective Transformations: Ransac", Multiple View Geometry, 4.7.1: 117-121, Jun. 1999.
Iivarinen et al. "Comparison of Combined Shape Descriptors for Irregular Objects", British Machine Vision Conference, BMVC '97, P.1-10, 1997.
Osada et al. "Shape Distributions", ACM Transactions on Graphics, 21(4): 807-832, Oct. 2002.
Sharon et al. "Fast Multiscale Image Segmentation", IEEE Computer Society Conference on Computer Vision and Pattern Recognition, 1: 1070-1077, 2000.
Sharon et al. "Segmentation and Boundary Detection Using Multiscale Intensity Measurements", Proceedings of the 2001 IEEE Computer Society Conference on Computer Vision and Pattern Recognition, CVPR 2001, 1:I-469-I-476, 2001.
Vose et al. "The Simple Genetic Algorithm and the Walsh Transform: Part II. The Inverse", Evolutionary Computation, 6(3): 275-289, Fall 1998.

* cited by examiner

*Primary Examiner* — Phillip A Johnston

(57) ABSTRACT

An image analysis system comprising: (a) an image input module adapted to receive a medical image; and (b) an analytic module adapted to segment the image, identify a plurality of vertebrae and label each vertebra.

30 Claims, 4 Drawing Sheets

SPINE LABELING

RELATED APPLICATION

This application claims the benefit of priority from Israel Patent Application No. 179581 filed on Nov. 26, 2006, the contents of which are incorporated herein by reference.

FIELD OF THE INVENTION

The present invention relates to systems methods and/or user interfaces for identifying vertebrae in a medical image.

BACKGROUND OF THE INVENTION

In 3D medical images such as, for example, MRI and CT images, it is typically not possible for an untrained observer to accurately identify vertebrae. Even an experienced radiologist can have difficulty identifying specific vertebra within the spine according to the standard C1-C7, T1-T12, L1-L5, and S1-S5 naming convention. This difficulty can be based in part on the similarity of a vertebra to its neighbors. In some cases a trained radiologist can identify a certain exceptional vertebra, for example the C2 and/or the L5.

SUMMARY OF THE INVENTION

A broad aspect of the invention relates to a system which accepts a medical image as an input and provides an output including labels on vertebrae in the image, optionally using the standard vertebral naming convention. Optionally, the medical image is a 3D medical image (e.g. magnetic resonance induction [MRI] or computerized tomography image [CT]). In an exemplary embodiment of the invention, the system is configured to label sections from the image in different sectioning planes. In an exemplary embodiment of the invention, the system includes a graphical user interface (GUI) which allows a user to enter data by indication one or more points on a section of the input image.

In an exemplary embodiment of the invention, the GUI accepts a user input identifying one point in a medical image as belonging to a vertebra. Optionally, the user input defines which vertebra the identified point belongs to.

In an exemplary embodiment of the invention, no user input is provided.

In an exemplary embodiment of the invention, the system is adapted to identify and/or analyze spinal irregularities.

In an exemplary embodiment of the invention the system begins by constructing a chain of candidate vertebral shapes in a presumed spine and then attempts to identify and label the vertebrae. Optionally, automatic identification of one vertebra with a specific relative position in the presumed spine is sufficient to register additional vertebrae with respect to the automatically identified vertebra.

In an exemplary embodiment of the invention, L5 can be identified by locating a point where there is a change in aggregate shape.

In an exemplary embodiment of the invention, L5 can be identified both by the shape of S2 and by the curvature of the spine near it.

In an exemplary embodiment of the invention, C2 can be identified by being the last in a long chain, and/or by its unique long shape.

An aspect of some embodiments of the invention relates to an algorithm for vertebral identification in a medical image, for example a 3D medical image. In an exemplary embodiment of the invention, the algorithm operates on a 3D data set and accepts input and/or provides output on 2D representations of sections of a 3D medical image. In an exemplary embodiment of the invention, the algorithm assembles initial small aggregates of pixels (e.g. 16, 32 or 64 pixels or smaller or intermediate or larger numbers of pixels) within the image and attempts to assemble the aggregates into larger aggregates. This process is repeated until the assembled aggregates are of a size which could represent a vertebra. After sufficiently large aggregates are assembled, the algorithm constructs chains of assembled aggregates and evaluates the chains to identify a best chain which represents a spine or a portion thereof.

In an exemplary embodiment of the invention, the algorithm relies upon segmentation, aggregate scoring, sieving and chain construction. Optionally, the algorithm employs segmentation to produce scaled aggregates. Optionally, scaled aggregates are registered with respect to one another to build chains which represent vertebrae forming a spine.

Optionally, pixels are grouped into initial small aggregates aggregates, based upon one or more criteria describing color or grayscale intensity. Optionally, the criteria are defined in terms of a pixel value and/or a pixel value relative to a value of one or more other pixels (e.g. color variance) and/or an average value within a group of pixels and/or a saliency of a group of pixels with respect to neighboring pixels. Saliency as used herein refers to a state or quality of standing out relative to neighboring items.

In an exemplary embodiment of the invention, a segmentation portion of the algorithm includes a Multi-scale Image Segmentation (MIS) algorithm. MIS divides the image into aggregates according to different size scales. In an exemplary embodiment of the invention, of the algorithm, within a size scale, each pixel in the image is assigned to a single aggregate. However, a single pixel may belong to multiple aggregates defined in different size scale. Optionally, scales in MIS can be defined in uniform or non-uniform increments. In an exemplary embodiment of the invention, smaller scale increments are implemented to bracket a size range of interest.

Optionally, the aggregate sieving portion of the algorithm includes size sieving and/or sieving with one or more shape descriptors and/or sieving by intensity distribution of the aggregate and/or sieving by evaluation of saliency of aggregates with respect to their surroundings.

Using one or more of the sieving procedures listed above, each aggregate is assigned a score that describes the likelihood of the aggregate to be a vertebra. At this stage, a significant portion of the aggregates in the image have been excluded from farther consideration. Optionally, exclusion of a significant portion of the aggregates from further consideration reduces a complexity and/or computational load in subsequent portions of the algorithm.

Throughout this specification and the accompanying claims, the score is sometimes referred to as a cost. The terms cost and score should be viewed as synonymous.

In an exemplary embodiment of the invention which employs MIS for aggregate segmentation, aggregates from different scales are merged, optionally hierarchically. In hierarchical merging a collection of aggregates containing a common point are evaluated to determine which of the aggregates is most likely to be a vertebra and/or be included in a chain being assembled. Optionally, only one of the aggregates is retained for consideration. In some embodiments of the invention, aggregate merging contributes to a reduction in complexity of the algorithm at the expense of accuracy and/or flexibility.

Optionally, merging allows the algorithm to consider aggregates from different scales, but does not allow consideration of all aggregates from all size scales when attempting to assemble a chain of aggregates which represent vertebrae in a spine.

For example, cervical vertebrae are often smaller than other vertebrae and can best be characterized by smaller aggregates. Alternately or additionally, lumbar vertebrae are often more robust and may belong to a different scale than other vertebrae. Optionally, the algorithm retains scale information for each aggregate. In some cases, a clinical problem can cause one or more vertebrae to be best described by aggregates of a different size and/or shape and/or intensity distribution and/or saliency than other vertebrae in a same spine. In an exemplary embodiment of the invention, scale information can be used in identification and/or analysis spinal irregularities and/or labeling of vertebrae within a spine.

In an exemplary embodiment of the invention, chain construction includes registration of aggregates with respect to one another. In general, registration serves to identify which of the aggregates with scores that suggest that they might represent vertebrae actually represent vertebrae and/or how a subset of the aggregates can be organized in a chain to represent a spine. In an exemplary embodiment of the invention, the registration portion of the algorithm attempts to define a path through a series of aggregates which could represent at least a portion of a spine.

Registration can employ, for example, a greedy algorithm or a non-greedy algorithm. Greedy registration algorithms select a good local solution for a next aggregate in the chain and discard other possibilities. Non-greedy algorithms attempt to select a good global solution by considering several local options and proceeding one or more steps based on each option. In general greedy registration algorithms offer a reduced computational burden at the expense of accuracy with respect to non-greedy registration algorithms. Examples of non-greedy algorithms include Dijkstra-like algorithms, Random Sample Consensus (RANSAC) algorithms and Genetic algorithms.

In some exemplary embodiments of the invention, the registration portion of the algorithm includes a Dijkstra-like algorithm for finding the best path in a graph of aggregates represented as nodes.

In some exemplary embodiments of the invention, the registration portion of the algorithm includes a Random Sample Consensus (RANSAC) algorithm for finding a set of inlier (as opposed to outlier) aggregates and estimating the parameters of a model which can define a best fit to the spine or a portion thereof as a whole.

In some exemplary embodiments of the invention, the registration portion of the algorithm includes a genetic algorithm to find true or approximate solutions to the problem of which aggregates can be assembled into a chain representing the spine.

In an exemplary embodiment of the invention, analytic circuitry recognizes spinal irregularities and takes the irregularities into account when labeling vertebrae. Optionally, spinal irregularities include, but are not limited to, one or more of vertebral fusion, vertebral repair, vertebral injury and vertebral replacement.

In an exemplary embodiment of the invention, registration proceeds by attempting to determine that two aggregates with scores that suggest they may represent vertebrae are within a specified range of distances one from the other. If the two aggregates meet the specified distance criteria, they can be connected. In an exemplary embodiment of the invention, the connection forms a chain with two "links" representing presumed vertebrae. Registration can continue by attempting to locate a third "link" with a score suggesting that it may be a vertebra which also meets the specified distance criteria from an end of the chain.

Optionally, the specified range of distances which determines whether two aggregates are linked in a chain is determined by anatomical models of distances between vertebrae in the spine and/or previously acquired data from the medical image. Alternately or additionally, a direction of the to-be-added aggregate (e.g. direction to its center from a center of a previous aggregate) is evaluated in terms of how straight the formed chain is. Optionally, a straight line is desired except at unless the L5 to S1 transition, where curvature is expected. In an exemplary embodiment of the invention, addition of a next aggregate to a chain employs a direction vector to evaluate candidate next aggregates.

In an exemplary embodiment of the invention, chain construction ends when the cost of an incremental addition is too high. The resulting best chain is considered to be a part of the spine, optionally all of the spine.

Optionally, a second chain is constructed concurrently in an opposite direction from a starting point of a first chain. In an exemplary embodiment of the invention, the first and second chains are joined at their common starting point.

In an exemplary embodiment of the invention, in the chains of aggregates, each aggregate represents a vertebra. Optionally, a label is applied to each vertebra according to its relative position in the chain with regard to a vertebra labeled by the user input and/or with regard to a specific vertebra identified by analytic circuitry.

In an exemplary embodiment of the invention, there is provided an image analysis system, the system comprising:

(a) an image input module adapted to receive a medical image; and (b) an analytic module adapted to segment the image, identify a plurality of vertebrae and label each vertebra.

Optionally, the label is according to the C1-C7, T1-T12, L1-L5, and S1-S5 convention.

Optionally, the medical image is a 3D image.

Optionally, the system comprises:

(c) a user input module adapted to allow a user to label at least one point in the medical image as belonging to a vertebra.

Optionally, the user input module is adapted to allow a user to indicate that the point belongs to a vertebra with a specified relative position within the spine.

Optionally, the system comprises:

(c) a display module adapted to display the medical image with the labels.

Optionally, the analytic module is adapted to identify vertebral irregularities.

Optionally, the analytic module is adapted to label vertebral irregularities.

In an exemplary embodiment of the invention, there is provided a method of automatically identifying vertebrae in a medical image, the method comprising:

(a) employing analytic circuitry to segment a data set representing a medical image into aggregates;

(b) identifying aggregates which correspond to vertebrae; and (c) labeling at least one identified aggregate with an indicator of relative position within a spine.

Optionally, the method comprises:

(d) operating a user input device to indicate at least one point in the medical image as belonging to a vertebra.

Optionally, the method comprises:

(e) operating a user input device to specify to which vertebra within the spine the at least one point belongs.

Optionally, the segmenting includes a Multi-scale Image Segmentation (MIS) algorithm.

Optionally, identifying aggregates which correspond to vertebrae comprises registering aggregates with respect to one another.

Optionally, the aggregates are represented as nodes on a graph.

Optionally, registering aggregates with respect to one another comprises application of a Dijkstra-like algorithm.

Optionally, the registration includes a Random Sample Consensus (RANSAC) like algorithm.

Optionally, the registration includes a genetic algorithm.

Optionally, the registration includes defining n-lets of aggregates wherein: $2 \leq n \leq 6$.

Optionally, the registering aggregates with respect to one another proceeds by evaluating overlapping n-lets.

Optionally, the registering aggregates with respect to one another proceeds by assembly of sequential n-lets.

Optionally, the labeling includes automated identification of a single vertebrae and identification of other vertebrae relative to the single identified vertebrae.

Optionally, the method comprises:

(d) displaying the indicators of relative position on two or more sections of a 3D medical image.

In an exemplary embodiment of the invention, there is provided a method of labeling vertebrae in a medical image, the method comprising:

(a) accepting a user input to an analytic apparatus, the user input indicating at least one point in a medical image as belonging to a specific vertebra indicated by the user; and (b) providing an output image from the analytic apparatus in which at least one additional vertebra is labeled.

In an exemplary embodiment of the invention, there is provided a method of identifying vertebrae in a medical image, the method comprising:

(a) providing a medical image comprising a plurality of aggregates; and (b) analyzing the aggregates to determine which aggregates correspond to vertebrae.

Optionally, the analyzing comprises analyzing an extension cost of a chain of aggregates.

BRIEF DESCRIPTION OF THE DRAWINGS

Exemplary non-limiting embodiments of the invention described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EXEMPLARY EMBODIMENTS

Overview

Figure 1A:
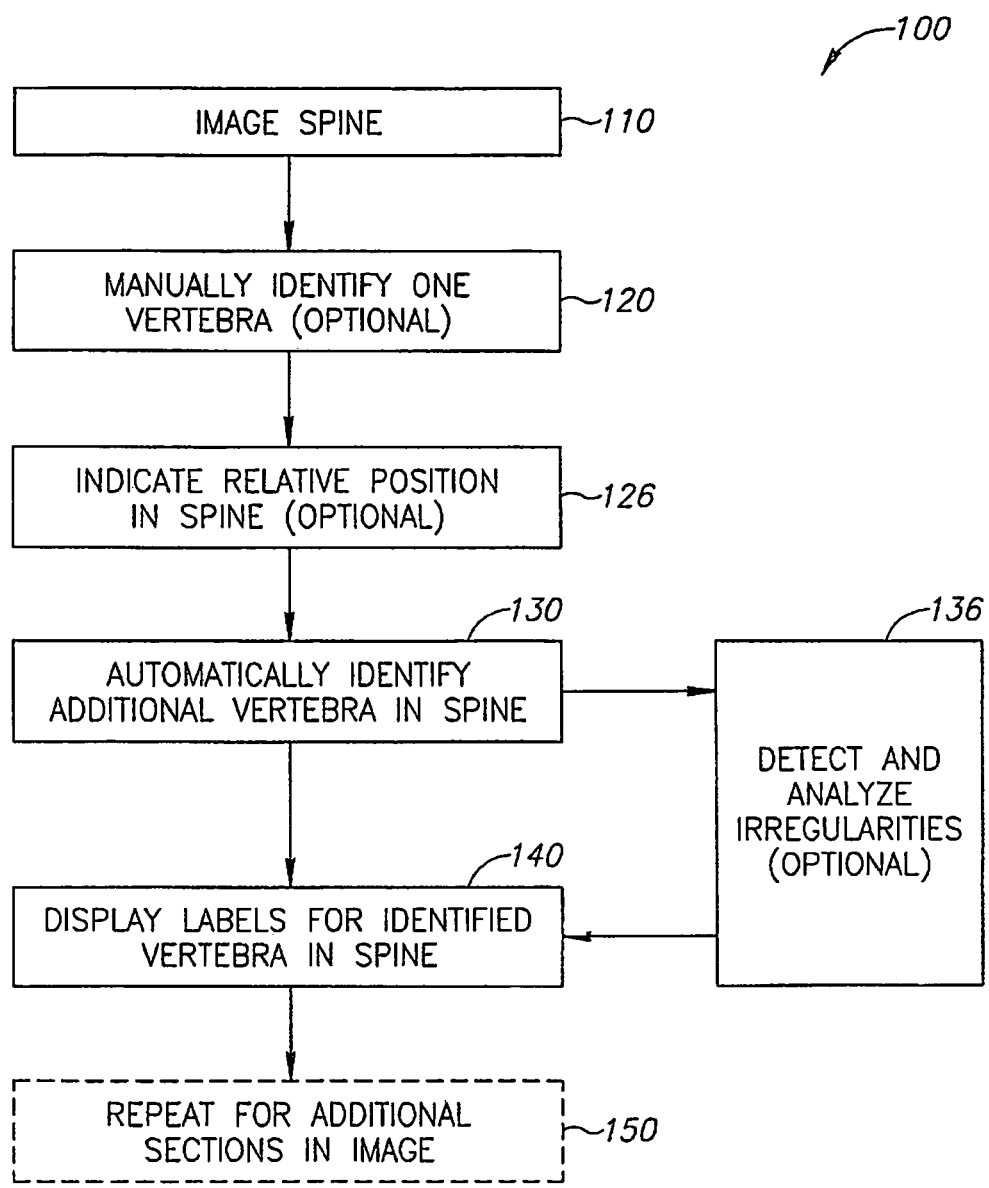
FIG. 1A is a simplified flow diagram illustrating a sequence of events associated with performance of an exemplary method of labeling vertebrae in a medical image according to some embodiments of the invention.

FIG. 1A is a simplified flow diagram illustrating an exemplary method 100 of labeling vertebrae in a medical image according to some embodiments of the invention.

Figure 1B:
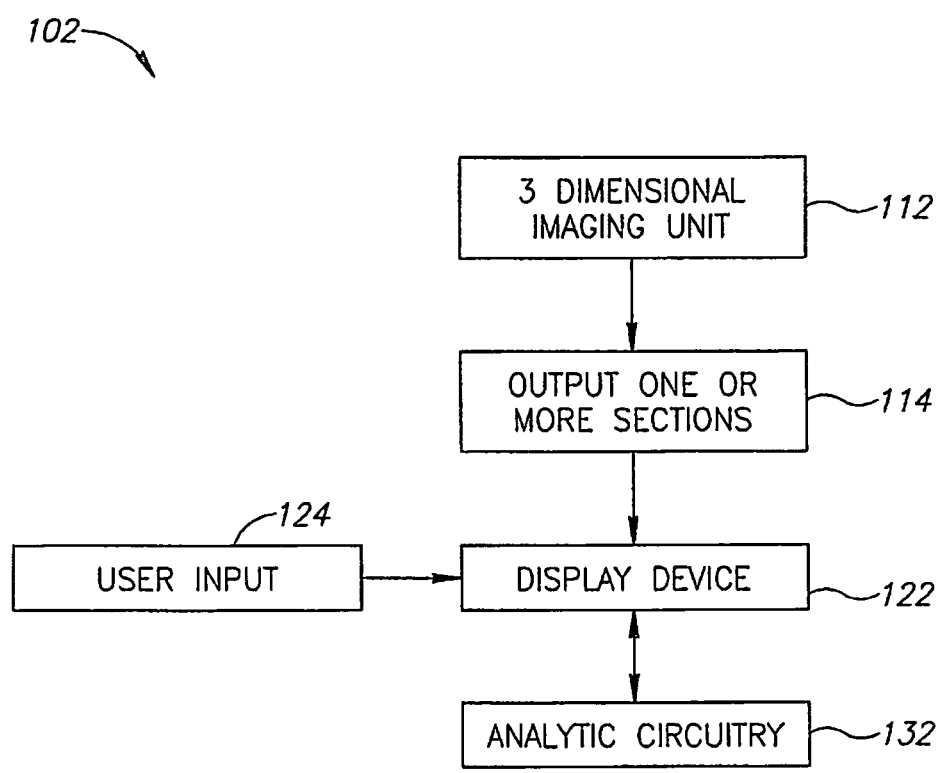
FIG. 1B is a schematic representation of an image analysis system according to some exemplary embodiments of the invention.

FIG. 1B is a schematic representation of an image analysis system 102 according to some exemplary embodiments of the invention.

Referring to FIGS. 1A and 1B, use of exemplary image analysis system 102 to perform an exemplary method 100 of labeling vertebrae is described. In general, the system and method attempt to assemble aggregates of pixels into a chain which represents a spine.

At 110 a spine is imaged using an imaging unit 112. In an exemplary embodiment of the invention, the imaging produces a 3D image. Optionally, imaging unit 112 is a magnetic resonance induction (MRI) unit or computerized tomography (CT) unit.

Imaging unit 112 provides one or more sections as output 114 which are optionally displayed on a display device 122 and/or presented as serial sections on a tangible media (e.g. X-ray film). Optionally, display device 122 can be at a high-throughput diagnosis station or at an analysis station.

In those exemplary embodiments of the invention which rely upon user input, imaging unit 112 can provide output 114 as unlabeled sections on a display screen.

In those exemplary embodiments of the invention which do not rely upon user input, imaging unit 112 provides labeled output 114 on a display screen or a tangible media.

Analytic circuitry 132 automatically identifies vertebrae in imaged spine 110. In some (fully automatic) exemplary embodiments automatic identification of vertebra in imaged spine 110 occurs before an initial display of the image. In other (semi-automatic) exemplary embodiments automatic identification of vertebra in imaged spine 110 occurs after an initial display of the image. Semi-automatic exemplary embodiments of the invention invite a user to input data prior to performing automatic identification. Fully automatic exemplary embodiments of the invention are generally characterized by a greater computational burden and/or longer latency time relative to semi-automatic exemplary embodiments and/or by an increased tendency towards error.

Circuitry 132 displays 140 labels for some or all of individual vertebrae present in the image on display device 122 after identification.

In an exemplary embodiment of the invention, displaying 140 is repeated 150 on additional sections in the image. In an exemplary embodiment of the invention, displaying 140 of labels in multiple image sections helps a user remain oriented when passing from one section to another section. Optionally, the user remains oriented even if the image sections are not viewed sequentially and/or if the image sections are in different planes of view (e.g. transverse and sagital; or transverse from different angles).

In semi-automatic exemplary embodiments of the invention a user input device 124 is connected to display device 122. Optionally, a user employs input device 122 to manually identify 120 a vertebra. Optionally, manual identification comprises indicating at least one anchor point in output 114 on display device 122 as belonging to a vertebra.

In some exemplary embodiments of the invention, manual identification comprises indicating 126 a vertebral name. Optionally, the vertebral name is according to the relative position convention using C1-C7, T1-T12, L1-L5, and S1-S5 nomenclature, although other vertebral names can be employed.

In semi-automatic exemplary embodiments of the invention, the algorithm attempts to include the anchor point in any candidate chain of aggregates being constructed by circuitry 132. Optionally, the algorithm is capable of rejecting a manually provided anchor point if it is unable include the anchor point in a satisfactory chain. According to these semi-automatic exemplary embodiments of the invention, circuitry 132 attempts to register adjacent vertebra with respect to the anchor point beginning from the anchor point in at least one direction.

User input device 124 can be, for example, in the form of a touch-screen or cursor manipulation instrument. Cursor manipulation instruments include, but are not limited to, track balls, track pads, joysticks and a computer mouse. Optionally, user input device 124 includes a data entry mechanism such as, for example, a keyboard, a keypad or an on-screen menu.

In some exemplary embodiments of the invention analytic circuitry 132 detects and/or analyzes spinal irregularities 136. Optionally, spinal irregularities are labeled and/or considered when labeling vertebrae.

Exemplary Analytic Algorithm

Figure 2:
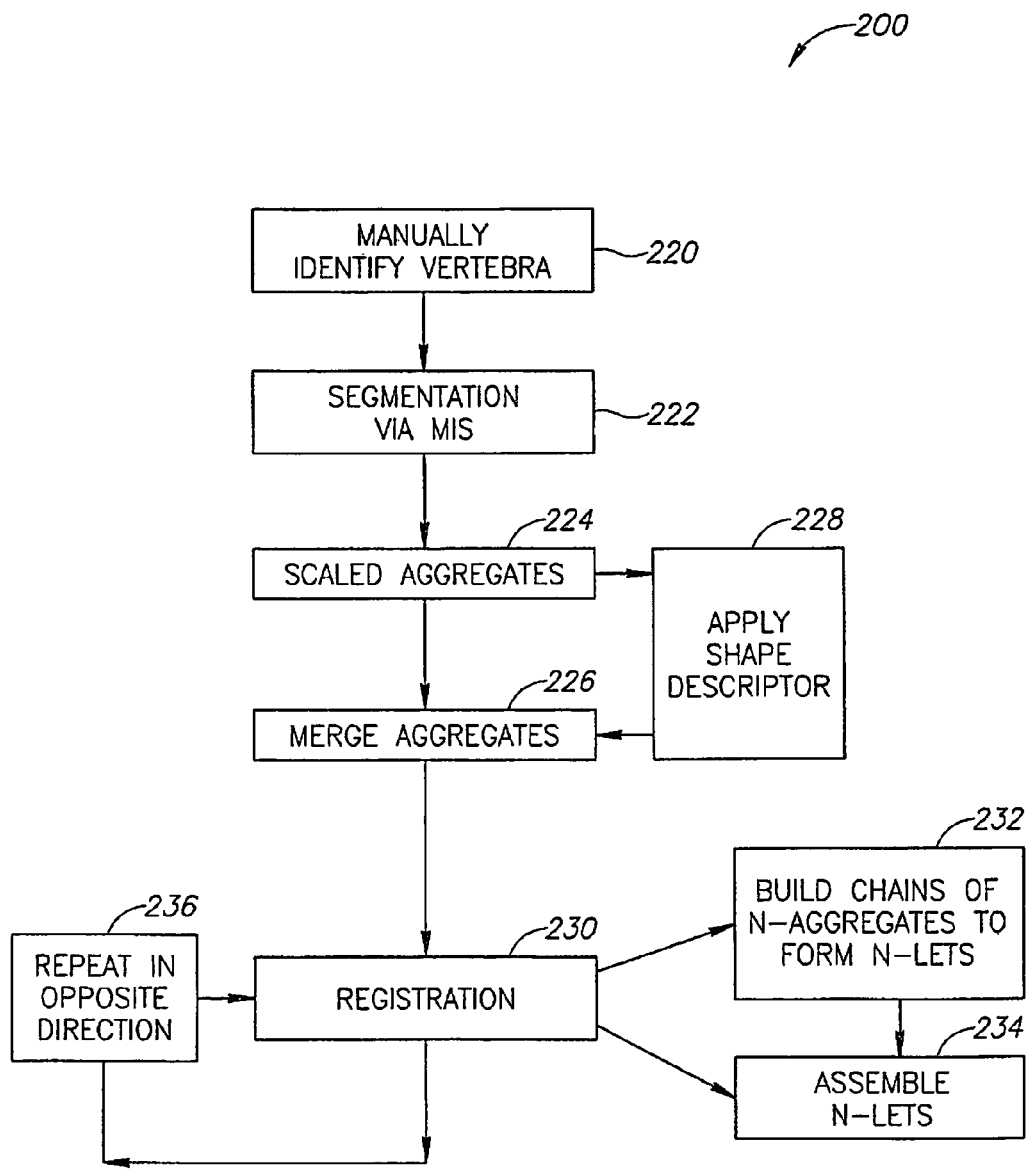
FIG. 2 is a simplified flow diagram illustrating a sequence of operations associated with an exemplary image analysis algorithm according to some embodiments of the invention.

FIG. 2 is a flow diagram of an exemplary analytic algorithm 200. Algorithm 200 includes processes performed by circuitry 132 in automatic identification of vertebrae 130 and/or detection 136 of spinal irregularities. In the depicted exemplary algorithm, segmentation 222 produces scaled aggregates 224. Optionally, scaled aggregates 224 are registered 230 to build chains 232 which represent vertebrae forming a spine.

In depicted exemplary algorithm 200, identification 130 begins with segmentation 222. Optionally, segmentation 222 is via a Multi-scale Image Segmentation (MIS) algorithm (described, for example in: E. Sharon et al., (2000) Fast multiscale image segmentation. *CVPR*, I: 70-77; E. Sharon et al., (2001) Segmentation and boundary detection using multiscale intensity measurements. *CVPR*, I: 469-476; and/or M. Galun et al. (2003) Texture segmentation by multiscale aggregation of filter responses and shape elements, *ICCV*: 716-723; the contents of each of which are fully incorporated herein by reference). MIS segments image data according to one or more selected scales and groups image pixels into aggregates. In an exemplary embodiment of the invention, when MIS is employed, any point in the image is assigned to only one aggregate in each scale.

Segmentation 224 produces a plurality of aggregates in various scales 224. According to exemplary embodiments of the invention, scaled aggregates 224 can be merged 226 and/or sorted by application of one or more shape descriptors 228.

In an exemplary embodiment of the invention, merging 226 of a family of overlapping aggregates from different scales is performed. When optional merging 226 is employed, a single aggregate with a best score is retained for further consideration as a candidate for inclusion in a chain from within each family of overlapping aggregates. Optionally, no merging is employed and two or more overlapping aggregates are evaluated individually. Optionally, merging 226 of aggregates can contribute to an advantage in making local decisions and/or a reduction in computational burden but can also contribute to an increased tendency towards error.

Optionally, shape descriptors are applied 228 to sort aggregates based upon geometric criteria. When optional shape descriptors are employed, each aggregate is scored based upon conformity to each shape descriptor (see, for example: Osada R. et al., Shape Distributions. ACM Transactions on Graphics, Vol. 21, No. 4, October 2002, pp 807-832 and Iivarinen et al. Comparison of Combined Shape Descriptors for Irregular Objects, in: <http://www.cis.hut.fi/research/IA/paper/publications/bmvc97/bmvc97.html>; the contents of each of which are fully incorporated herein by reference). In an exemplary embodiment of the invention, shape descriptors are provided as aspect ratios. Optionally, a shape descriptor and/or a score with regard to the shape descriptor can be used to identify a specific vertebra.

In an exemplary embodiment of the invention, each aggregate from all scales is assigned a cost based upon one or more of conformity to shape descriptors, average gray scale value (or average color value), aggregate texture, variance of pixels within the aggregate and saliency with respect to surrounding portions of the image. The aggregate cost is a statistical predictor of how likely it is that the aggregate represents a vertebra.

In an exemplary embodiment of the invention, the cost of each aggregate in a chain is used as a one criterion when assembling a chain of aggregates to represent a spine.

In an exemplary embodiment of the invention, each aggregate is characterized by an extension cost which indicates how likely the aggregate is to be a next link in a chain. The extension cost optionally considers one or more of distance from a previous link (or links), direction vector with respect to a previous link (or links), color/grayscale value relative to a previous link (or links) and conformity to an anatomical model of the spine (or a portion thereof).

In an exemplary embodiment of the invention, the extension cost of adding each new aggregate to a chain is used as an additional criterion when assembling a chain of aggregates to represent a spine.

Evaluation of a cost of each aggregate and/or an extension cost can be based upon one or more of analysis of previously diagnosed images and/or a current progress of an analysis in the current image and/or manual input from a use. For example, a user may be presented with two potential "next aggregates" on display 122 and asked to choose between them. Optionally, C2 and/or L5 vertebrae are especially useful in evaluating a candidate chain in terms of cost.

In those exemplary embodiments of the invention which employ an MIS segmentation algorithm, aggregates are optionally generated in a hierarchy. According to MIS, a finest scale identifies aggregates of a selected size (e.g. 16 pixels in a presented section).

In an exemplary embodiment of the invention, the algorithm works on a 3D data set even though a user is presented with 2D sections. A transition factor between voxels and pixels can vary with section thickness. If sections with a thickness corresponding to a depth of 1 pixel are presumed, a 16 pixel aggregate in 2D corresponds to a 64 voxel aggregate in 3D.

A second scale assembles aggregates defined by the finest scale into larger aggregates (e.g. 32 or 64 pixels or 256 or 16,384 voxels). The process is repeated until aggregates of a desired size are achieved. Aggregates in each successive scale are, in general, larger than those in a previous scale.

In an exemplary embodiment of the invention, the algorithm works on a 2D data from a single section, optionally a sagital section, presented to a user. For identification of vertebrae, aggregates of 36-1600 mm$^2$ are optionally desired. In a typical medical image an average pixel size can be, for example, 0.4 to 0.8 mm optionally about 0.6 mm. If 0.6 mm pixels are employed, an aggregate which might represent a vertebra is 21 to 960 pixels in size.

In an exemplary embodiment of the invention, aggregates from two or three or four scales bracketing the desired size range are employed when attempting to assemble a chain.

In those exemplary embodiments of the invention which do not include merging 226, when circuitry 132 attempts to assemble aggregates into a chain, an aggregate is optionally discarded as a candidate for inclusion in a chain if a spatially overlapping aggregate from a different scale has a better cost.

According to exemplary algorithm 200, aggregates are registered 230 with respect to one another and/or to a spinal model attempting to build a best chain of aggregates. In an exemplary embodiment of the invention, registration employs a non-greedy algorithm such as, for example, a Dijkstra-like algorithm, a Random Sample Consensus (RANSAC) type algorithm or a Genetic algorithm.

Dijkstra-like algorithms are described, for example, in: Cormen et al. (2001) *Introduction to Algorithms*, $2^{nd}$ Ed. MIT, Cambridge Mass.; the contents of which are fully incorporated herein by reference. In those exemplary embodiments of the invention which include a Dijkstra-like algorithm, aggregates are arranged in memory of circuitry 132 as nodes on a lines representing extension costs connecting them. Optionally, the graph is searched for one or more sequences of adjacent aggregates (n-lets), where n equals 2, 3 or 4 or a larger integer. In an exemplary embodiment of the invention, construction 232 of a first n-let begins from an aggregate containing a point indicated by a user input as belonging to a vertebra. Optionally, a cost of each n-let comprises the costs of the aggregates that it contains and their relative positions. In an exemplary embodiment of the invention, selected n-lets are substantially straight. In an exemplary embodiment of the invention, use of n-lets contributes to evaluation of larger portions of the image than use of single aggregates.

In an exemplary embodiment of the invention overlapping n-lets are employed in chain construction. According to this exemplary embodiment, once an initial n-let is selected, the last n-x aggregates (where x is any integer less than n) are considered as a base for a new n-let and circuitry 132 analyzes available aggregates as candidates to complete the new n-let. Each new n-let is joined 234 to the previous n-let by the aggregates which are common to both n-lets.

In an exemplary embodiment of the invention discrete n-lets are employed in chain construction 234. According to this exemplary embodiment, once an initial n-let is selected circuitry 132 looks n steps ahead and chooses the best available new n-let. A first aggregate in the chosen best available new n-let is joined to a last aggregate in the initial n-let.

Use of n-lets contributes to construction of a chain which is longer than n with an algorithm having a computational burden which is determined by n. Optionally, there is a tradeoff between score and chain length. For example, it may be easier to achieve a higher score if a smaller n is defined.

Optionally, if n is too small (e.g. n=1 or n=2) the algorithm does not allow for quasi global spinal characteristics to be evaluated (vertebra size, distance, direction, etc.). Alternatively or additionally, if n is too large, it may force a similarity that is no longer anatomical.

Alternately or additionally, in evaluation of the entire chain, if a long chain is favored at the expense of extension cost, but this encourages construction of false long chains. Alternately or additionally, in evaluation of the entire chain, if a short chain is favored greater uniformity can be achieved and a more favorable extension cost can be achieved. However, short chains do not span the whole spine contained in the image. In some exemplary embodiments of the invention, short chains are constructed and a subset of candidate short chains are assembled into a longer chain.

In those exemplary embodiments of the invention which include a Dijkstra-like algorithm, analysis of the graph begins with construction of a single n-let with n representing a number of candidate vertebrae. In semi-automatic embodiments of the invention, the single n-let begins from the anchor point.

This chain is extended using either overlapping or discrete extension as described above until either the best n-let chosen has an unacceptable cost or no additional aggregates are available for chain extension (e.g. if a boundary of the image is reached). In an exemplary embodiment of the invention, when the best n-let chosen has an unacceptable cost it indicates that an end of the spine has been reached.

When chain construction is concluded, display 140 of labels is optionally implemented.

Optionally, chain construction proceeds in two opposite directions, or is repeated 236 in an opposite direction to produce two partial chains with a common point (e.g. manually identified vertebra 220). In an exemplary embodiment of the invention, the partial chains are assembled into a "whole chain" by circuitry 132. Optionally, the whole chain includes aggregates representing all vertebrae visible in the image. According to different exemplary embodiments of the invention, construction of the two partial chains can be concurrent or sequential. Optionally, a number of vertebrae in the image has a non-linear effect on time and/or computational resources needed for the algorithm to complete the chain with greater numbers of vertebrae requiring more time and/or computational resources. In an exemplary embodiment of the invention, use of n-lets with a smaller n can partially compensate for temporal delays and/or increased computational burden associated with analysis of larger numbers of vertebrae.

Typically, longer n-lets are computationally more costly and shorter n-lets are computationally cheaper.

In some exemplary embodiments of the invention, registration includes use of a Random Sample Consensus (RANSAC) type algorithm.

RANSAC is an algorithm which can estimate parameters of a mathematical model from a set of observed data which contains outliers. The RANSAC algorithm is based upon the assumption that, given a set of inliers, there exists a procedure which can estimate the parameters of a model that defines a best fit. (See, for example: M. A. Fischler and R. C. Bolles (1981). "Random Sample Consensus: A Paradigm for Model Fitting with Applications to Image Analysis and Automated Cartography". *Comm. of the ACM* 24:381-395; David A. Forsyth and Jean Ponce (2003). *Computer Vision, a modern approach*. Prentice Hall; and Richard Hartley and Andrew Zisserman (2003) *Multiple View Geometry in computer vision*, 2nd edition, Cambridge University Press, the contents of each of which are fully incorporated herein by reference).

Use of a RANSAC type algorithm optionally contributes to increased speed and/or accuracy by establishing a line or curve which defines the spine and attempting to register those aggregates which the line passes through. Optionally, RANSAC employs a mathematical representation of an anatomic model of the spine (e.g. a polynomial model such as a $3^{rd}$ degree polynomial) and determines a subset of aggregates which provide a good, optionally best, fit.

In some exemplary embodiments of the invention, the registration portion of the algorithm includes a genetic algorithm. Genetic algorithms employ global search heuristics inspired by evolutionary biology and can be implemented as computer simulations in which a population of abstract representations (e.g. aggregates) of candidate solutions (e.g.

chains of aggregates) to an optimization problem evolves toward better solutions. In a genetic algorithm, evolution starts from a population of randomly generated chains and happens in generations. In each generation, the fitness of every chain is evaluated, multiple chains are stochastically selected from all available chains (based on their fitness), and modified (recombined and possibly mutated) to form a new set of available chains. The new set of available chains is then used in the next iteration of the algorithm (see, for example Vose, Michael D (1999), *The Simple Genetic Algorithm: Foundations and Theory*, MIT Press, Cambridge, Mass.; the contents of which are fully incorporated herein by reference).

In fully automatic exemplary embodiments of the invention, registration includes automatically identifying a specific vertebra in the image as having a specific relative position in the spine. Optionally, this automatic identification employs a specialized shape descriptor 228 to identify an anatomically differentiable vertebra. Examples of anatomically differentiable vertebra include C2 and L5 vertebra.

In an exemplary embodiment of the invention, automatic identification of one vertebra with a specific relative position in the spine is sufficient to register additional vertebrae with respect to the automatically identified vertebra. For example, once an aggregate chain representing a spine has been constructed, but not yet labeled, L5 can be identified by locating a point where there is a change in aggregate shape. L4 has a similar shape to L5 but S1 has a different shape. Optionally, S1 may not be detected during construction but is searched for specifically after the chain construction ends near the ends of the chain.

In an exemplary embodiment of the invention, L5 can be identified both by the shape of S2 and by the curvature of the spine near it.

In an exemplary embodiment of the invention, C2 can be identified by being the last in a long chain, and/or by its unique long shape.

Exemplary Output

Figure 3A:
FIG. 3A is a medical image including a sagital section of a spine prior to processing according to an exemplary algorithm according to the present invention.

FIG. 3A is a medical image including a sagital section of a spine prior to processing according to an exemplary algorithm according to the invention.

Figure 3B:
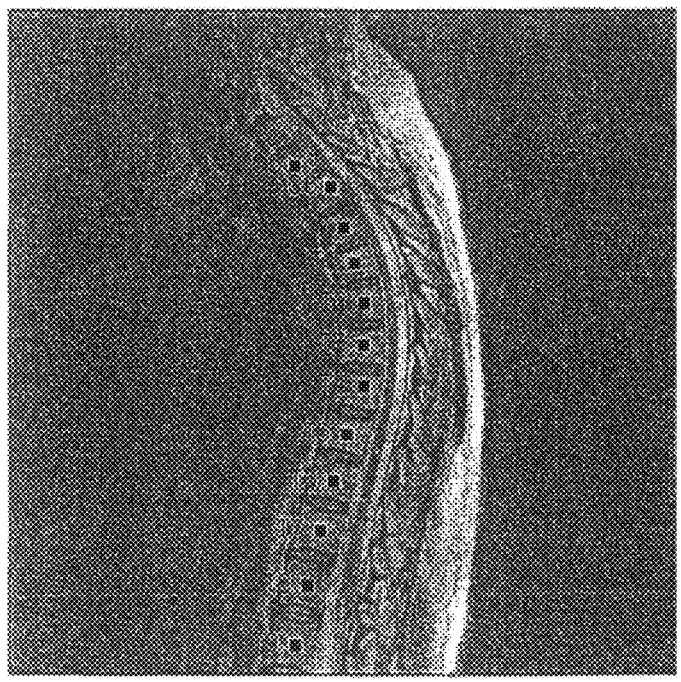
FIG. 3B is the same medical image of FIG. 3A after processing according to an exemplary algorithm according to the present invention.

FIG. 3B is the same medical image of FIG. 3A after processing according to an exemplary algorithm according to the invention. Each vertebra is clearly labeled using conventional designations.

Spinal Irregularities

In an exemplary embodiment of the invention, method 100 is practiced on a patient with spinal irregularities. In order for displayed labels 140 to be accurate, circuitry 132 detects and analyzes 136 the irregularities and takes them into account during registration 230.

According to various exemplary embodiments of the invention, different types of irregularities are detected, analyzed and taken into account in different ways.

In an exemplary embodiment of the invention, circuitry 132 identifies vertebral fusions as oversized aggregates or as a collection of aggregates with insufficient space between them. For example, in men vertebrae have an average axial length of about 2.5 cm and in won an average axial length of about 2.1 cm. Any aggregate with an axial length greater than 1.3, 1.5, 1.7 or 2 times these average lengths or lesser or intermediate or greater number of times the average axial length may indicate a fusion of two or more vertebrae. Alternatively or additionally, distances of less than 7, 5, 3, 2 or 1 mm or lesser or greater or intermediate distances between aggregates which might normally be used to exclude two aggregates as being too close to one another can indicate a vertebral fusion.

In the case of fusions, circuitry 132 optionally analyzes how many vertebrae have been fused. Optionally, the analysis of how many vertebrae were fused is based on a size of the fusion. Typically, the number will be 2, 3 or 4. During registration 230, the fused portion of the spine is counted as an appropriate number of vertebrae and a next vertebra after the fusion is numbered accordingly.

In an exemplary embodiment of the invention, circuitry 132 detects and analyzes 136 repaired and/or injured vertebrae. In some exemplary embodiments of the invention, detection relies upon special shape descriptors 228 provided to detect injury and/or repair. In some exemplary embodiments of the invention, detection relies upon input from user input device 124 and/or from a medical history supplied to circuitry 132. Supply of medical history can be, for example, from a hospital information system, from patient records or from previous manual analysis. As in the case of fusions, injured or repaired vertebrae are optionally included or omitted in an aggregate chain being constructed. Labeling resumes after the irregular vertebra is considered.

Some orthopedic repairs include insertion of metal and/or plastic and/or cement into the spine. Each of these materials generally has a different appearance in a medical image than vertebral bone. In some exemplary embodiments of the invention, non-bone pixels are deleted or ignored. In some exemplary embodiments of the invention, circuitry 132 extends existing lines to "complete" aggregate shapes interrupted by non-bone material. Optionally, completion is by extrapolation and/or interpolation and/or by matching to shape descriptors.

In an exemplary embodiment of the invention, circuitry 132 detects and analyzes 136 prosthetic vertebrae. In some cases, prosthetic vertebrae at least partially conform to shape and/or size criteria for a normal vertebra, but appear as non-bone material in the image. In an exemplary embodiment of the invention, circuitry 132 incorporates a next aggregate of a correct size and/or shape into a chain of aggregates even if the next aggregate is not bone.

In an exemplary embodiment of the invention, labels for irregularities are displayed 140. For example, a fused L2+L3 might be labeled as F[L2+L3] and a prosthetic L2 might be labeled as PR[L2].

Systems, methods and graphical user interface (GUI) according to exemplary embodiments of the invention rely upon execution of various commands and analysis and translation of various data inputs. Any of these commands, analyses or translations may be accomplished by software, hardware or firmware according to various embodiments of the invention. In an exemplary embodiment of the invention, machine readable media contain instructions for segmentation and/or scaling and/or merging and/or scoring with regard to a shape descriptor and/or registration and/or chain assembly. In an exemplary embodiment of the invention, analytic circuitry 132 executes instructions for segmentation and/or scaling and/or merging and/or scoring with regard to a shape descriptor and/or registration and/or chain assembly.

The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. The described embodiments comprise different features, not all of which are required in all embodiments of the invention. Some embodiments of the invention utilize only some of the features or possible combinations of the features. Alternatively or additionally, portions of the invention described/depicted as a single unit may reside in two or more separate physical entities which act in concert to perform the described/depicted function. Alternatively or additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. The scope of the invention is limited only by the following claims. Alternately or additionally, features described in the context of methods may characterize systems and/or GUIs and features described in the context of systems and/or GUIs may characterize methods.

In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb.

All publications and/or patents and/or product descriptions cited in this document are fully incorporated herein by reference to the same extent as if each had been individually incorporated herein by reference.

The invention claimed is:

1. An image analysis system, the system comprising:
   (a) an image input module adapted to receive a medical image; and
   (b) an analytic module adapted to segment the image into a plurality of aggregates of voxels, to automatically construct a chain of aggregates which could represent vertebrae in a spine, to evaluate at least some of the aggregates in the chain to identify a vertebra which the aggregate corresponds to, and to label each identified vertebra.

2. A system according to claim 1, wherein the label is according to the C1-C7, T1-T12, L1-L5, and S1-S5 convention.

3. A system according to claim 1, wherein the medical image is a 3D image.

4. A system according to claim 1, comprising:
   (c) a user input module adapted to allow a user to label at least one point in the medical image as belonging to a vertebra.

5. A system according to claim 4, wherein the user input module is adapted to allow a user to indicate that the point belongs to a vertebra with a specified relative position within the spine.

6. A system according to claim 1, comprising:
   (c) a display module adapted to display the medical image with the labels.

7. A system according to claim 1, wherein the analytic module is adapted to identify vertebral irregularities.

8. A system according to claim 7, wherein the analytic module is adapted to label vertebral irregularities.

9. A method of automatically identifying vertebrae in a medical image, the method comprising:
   (a) employing analytic circuitry to segment a data set representing a medical image into a plurality of aggregates, and to automatically construct a chain of aggregates which could represent vertebrae in a spine;
   (b) evaluating at least some of the aggregates in the chain to identify a vertebra that the aggregate corresponds to; and
   (c) labeling at least one identified aggregate with an indicator of relative position within a spine.

10. A method according to claim 9, comprising:
    (d) operating a user input device to indicate at least one point in the medical image as belonging to a vertebra.

11. A method according to claim 10, comprising:
    (e) operating a user input device to specify to which vertebra within the spine the at least one point belongs.

12. A method according to claim 9, wherein the segmenting includes a Multi-scale Image Segmentation (MIS) algorithm.

13. A method according to claim 9, wherein identifying aggregates which correspond to vertebrae comprises registering aggregates with respect to one another.

14. A method according to claim 9, wherein the aggregates are represented as nodes on a graph.

15. A method according to claim 14, wherein registering aggregates with respect to one another comprises application of a Dijkstra-like algorithm.

16. A method according to claim 14, wherein the registering aggregates with respect to one another comprises application of a Random Sample Consensus (RANSAC) like algorithm.

17. A method according to claim 14, wherein the registering aggregates with respect to one another comprises application of a genetic algorithm.

18. A method according to claim 14, wherein the registering aggregates with respect to one another comprises defining n-lets of aggregates wherein: $2 \leq n \geq 6$.

19. A method according to claim 18, wherein registering aggregates with respect to one another proceeds by evaluating overlapping n-lets.

20. A method according to claim 18, wherein registering aggregates with respect to one another proceeds by assembly of sequential n-lets.

21. A method according to claim 9, wherein labeling includes automated identification of a single vertebrae and identification of other vertebrae relative to the single identified vertebrae.

22. A method according to claim 9, comprising:
    (d) displaying the indicators of relative position on two or more sections of a 3D medical image.

23. A method according to claim 9 comprising accepting a user input to the analytic circuitry, the user input indicating at least one point in the medical image as belonging to a specific vertebra indicated by the user, wherein labeling at least one identified aggregate comprises labeling at least one aggregate identified as corresponding to a different vertebra than the vertebra indicated by the user.

24. A method of identifying vertebrae in a medical image, the method comprising:
    (a) providing a medical image comprising a plurality of aggregates;
    (b) automatically analyzing the aggregates to determine which aggregates correspond to vertebrae, independent of any user identification of a vertebra.

25. A method according to claim 24, wherein the analyzing comprises analyzing an extension cost of a chain of aggregates.

26. A system according to claim 1, wherein the analytic module is adapted to evaluate the aggregates based upon one or more of conformity to shape descriptors, size, average voxel value, variance of voxel value, and saliency with respect to surrounding portions of the image.

27. A system according to claim 7, wherein the vertebra irregularities comprise one or more of fused, repaired, and injured vertebrae.

28. A method according to claim 9, wherein evaluating at least some of the aggregates comprises evaluating based upon one or more of conformity to shape descriptors, size, average voxel value, variance of voxel value, and saliency with respect to surrounding portions of the image.

29. A system according to claim 1, wherein the analytic module is adapted to identify the vertebra automatically, prior to any user identification of a vertebra.

30. A method according to claim 9, wherein evaluating the aggregates to identify a vertebra is done automatically, prior to any user identification of a vertebra.

* * * * *